(12) United States Patent
Boira Bonhora et al.

(10) Patent No.: US 12,344,415 B2
(45) Date of Patent: Jul. 1, 2025

(54) SYSTEM AND METHOD FOR DISPENSING A LIQUID IN A CLOSED CHAMBER

(71) Applicant: GRIFOLS WORLDWIDE OPERATIONS LIMITED, Dublin (IE)

(72) Inventors: Jordi Boira Bonhora, Barcelona (ES); Carlos Roura Salietti, Barcelona (ES)

(73) Assignee: GRIFOLS WORLDWIDE OPERATIONS LIMITED, Dublin (IE)

(*) Notice: Subject to any disclaimer, the term of this patent is extended or adjusted under 35 U.S.C. 154(b) by 188 days.

(21) Appl. No.: 17/906,053

(22) PCT Filed: Mar. 9, 2021

(86) PCT No.: PCT/IB2021/051950
§ 371 (c)(1),
(2) Date: Mar. 23, 2023

(87) PCT Pub. No.: WO2021/181270
PCT Pub. Date: Sep. 16, 2021

(65) Prior Publication Data
US 2023/0234734 A1    Jul. 27, 2023

(30) Foreign Application Priority Data
Mar. 12, 2020    (EP) .................................... 20382186

(51) Int. Cl.
*B65B 3/00* (2006.01)
*B01L 1/00* (2006.01)
(Continued)

(52) U.S. Cl.
CPC ................ *B65B 3/003* (2013.01); *B01L 1/50* (2013.01); *B01L 3/0293* (2013.01);
(Continued)

(58) Field of Classification Search
CPC ............ B01L 1/04; B25J 21/00; B25J 21/005
See application file for complete search history.

(56) References Cited

U.S. PATENT DOCUMENTS 11,125,767 B2 * 9/2021 Ahlfors ..................... B01L 1/02
2004/0185521 A1   9/2004 Yoshida et al.
(Continued)

FOREIGN PATENT DOCUMENTS

EP          2534052 A1     6/2014
WO   WO 2010/100234 A1    9/2010
(Continued)

OTHER PUBLICATIONS

International Search Report PCT/IB2021/051950 issued May 17, 2021.
(Continued)

*Primary Examiner* — Timothy L Maust
(74) *Attorney, Agent, or Firm* — Knobbe, Martens, Olson & Bear LLP (57) ABSTRACT

A system for dispensing a liquid in a closed chamber includes at least one rapid transfer port in at least one wall of the closed chamber. In addition, a liquid is dispensed in a closed chamber that includes at least one rapid transfer port in at least one wall of the closed chamber.

15 Claims, 6 Drawing Sheets

(51) Int. Cl.
*B01L 3/02* (2006.01)
*B25J 21/00* (2006.01)
(52) U.S. Cl.
CPC ....... *B25J 21/005* (2013.01); *B01L 2200/026* (2013.01); *B01L 2200/06* (2013.01)

(56) References Cited

U.S. PATENT DOCUMENTS

2015/0114515 A1    4/2015  Phallen
2019/0344257 A1   11/2019  Naing
2022/0379500 A1*  12/2022  Merz ..................... B25J 21/005

FOREIGN PATENT DOCUMENTS

WO    WO 2015/023934 A2    2/2015
WO    WO 2018024737 A1     2/2018
WO    WO-2021040983 A1 *   3/2021   ................ B01L 1/04

OTHER PUBLICATIONS

Third Party Observation issued Jan. 29, 2025 for application No. EP20210710608, which is related to the corresponding application.

* cited by examiner

SYSTEM AND METHOD FOR DISPENSING A LIQUID IN A CLOSED CHAMBER

PRIORITY AND CROSS REFERENCE TO RELATED APPLICATIONS

This application is the U.S. National Phase Application under 35 U.S.C. § 371 of International Application No. PCT/IB2021/051950, filed Mar. 9, 2021, designating the U.S. and published as WO 2021/181270 A1 on Sep. 16, 2021, which claims the benefit of Foreign application No. 20382186.3, filed Mar. 12, 2020. Any and all applications for which a foreign or a domestic priority is claimed is/are identified in the Application Data Sheet filed herewith and is/are hereby incorporated by reference in their entireties under 37 C.F.R. § 1.57.

FIELD

The present invention relates to the field of dispensing of liquids in a closed chamber. More specifically, the present invention relates to a system and a method for dispensing a liquid in a closed chamber.

BACKGROUND

In industry, and in particular in the pharmaceutical industry, there is a growing need to dispense liquids, for example, in single-dose containers, preventing the contamination thereof, whether by particles of different sizes (dust, pollen, hair, etc.) or by microorganisms or similar. For this reason, the use of what are known as cleanrooms or white rooms, i.e. rooms designed to maintain extremely low levels of particles, such as dust, airborne particles or vaporised particles. Among other factors, white rooms must to have strictly controlled environmental parameters: airborne particles, temperature, humidity, airflow, interior air pressure, lighting, etc.

However, at times cleanrooms do not offer a sufficient level of cleanliness, or are such that achieving and maintaining the necessary level of cleanliness is very complicated and costly. Accordingly, the use of isolators is becoming more widespread, said isolators being understood as devices closed by physical barriers (walls, etc.) and also generally by aerodynamic barriers (excess or reduced pressure of the interior relative to the exterior), such that the interior of the isolator is completely isolated from its exterior, thus preventing possible contaminants from entering or leaving the interior, depending on whether the 'clean' or 'dirty' environment is found inside or outside the isolator.

In the case of industry, isolators are often used to maintain in their interior the necessary requirements of sterility and cleanliness for the process that is to be carried out, without requiring the chamber in which the isolator is located to have the same closed chamber cleanliness grade as the interior of said isolator. According to ISO standard 14644-1:2015 'Cleanrooms and associated controlled environments. Part 1: Classification of air cleanliness by particle concentration', closed chambers are classified into four grades (A, B, C, D) depending on the maximum number of particles of a size equal to or larger than 0.5 µm and 5 µm, when idle and in operation.

Due to its nature, the presence of people, or their limbs (such as arms and hands, for example) inside the isolator is not possible, and therefore isolators are usually equipped with one or more gloves connected to the external structure thereof which allow an operator to manipulate the interior of the isolator, but without 'breaking' the isolation barrier.

Modern isolators usually incorporate one or more rapid transfer ports (RTP), that allow, in a relatively rapid and simple way, the aseptic transfer of components such as, for example, sterile vials, syringes, bottles or other types of containers, as well as the actual product from and to the interior of an isolator. At present, various types of rapid transfer ports exist, the most common being the DPTER transfer system (Double Porte pour Transfert Etanche) from Getinge La Calhene and the SART System® (Sartorius Aseptic Rapid Transfer System) from Sartorium Stedim Biotech®.

Although the operators working with isolators are usually highly qualified, said operators may be a source of errors and/or accidents which may damage the contents of the isolator and even damage their own health.

SUMMARY

In some embodiments, a system for dispensing a liquid in a closed chamber which includes least a one rapid transfer port in at least one wall of said the closed chamber, a first container configured to be coupled to the rapid transfer port, where the first container housing in its interior a dispensing system which comprises a plurality of dispensing nozzles 96—held in a support, and a robotic arm configured to remove the support and the plurality of dispensing nozzles from the first container and place them in a liquid dispensing position inside the closed chamber. In some embodiments, the robotic arm is configured to open the rapid transfer port before removing the plurality of dispensing nozzles from the first container. In some embodiments, the robotic arm is configured to remove the plurality of dispensing nozzles from the liquid dispensing position and introduce them into the container and close the rapid transfer port. In some embodiments, the dispensing system comprises a pipe connected to the plurality of dispensing nozzles and to a second container which contains the liquid to be dispensed, where the second container is positioned outside of the first container and of the closed chamber. In some embodiments, the at least one rapid transfer port is a DPTE® port (Double Porte pour Transfert Etanche) or SART System® (Sartorius Aseptic Rapid Transfer System). In some embodiments, the closed chamber is an isolator or a suitable cleanroom. In some embodiments, the closed chamber is configured to dispense blood products and/or haemoderivative products or dispense medicine. In some embodiments, a method of dispensing a liquid in a closed chamber which comprises at least one rapid transfer port in at least one wall of said the closed chamber. The method includes coupling the rapid transfer port to a first container, which houses in its interior, where the first container has a dispensing system which comprising of a plurality of dispensing nozzles held in a support, opening the rapid transfer port so that the interior of the first container is connected with the closed chamber, removing from the first container the support and the plurality of dispensing nozzles from the first container and placing them in a liquid dispensing position inside the closed chamber using a robotic arm, dispensing an amount of liquid, removing the support and the plurality of dispensing nozzles from the dispensing position and re-introducing them into the first container, closing the rapid transfer port and uncoupling the first container from the rapid transfer port. In some embodiments, the opening and closing of the rapid transfer port, the removal of the dispensing nozzles and the re-introduction into the first container is carried out by a robotic arm. In some embodiments, before carrying out the dispensing of the liquid, a pipe connected to the plurality of dispensing nozzles is connected to a second container which contains the liquid to be dispensed, where the second container is outside of the first container and of the closed chamber.

DETAILED DESCRIPTION

The object of the present invention is to disclose a system for dispensing a liquid in a closed chamber that minimises, or even eliminates, human intervention. Accordingly, the present invention discloses a system for dispensing a liquid in a closed chamber which comprises:
- at least one rapid transfer port in at least one wall of said chamber,
- a first container configured to be coupled to the rapid transfer port, said first container housing in its interior a dispensing system which comprises a plurality of dispensing nozzles held in a support,
- a robotic arm configured to remove the support and the plurality of dispensing nozzles from the first container and place them in a liquid dispensing position inside the closed chamber.

More specifically, the present invention discloses a system for dispensing a liquid which comprises:
- a closed chamber,
- at least one rapid transfer port in at least one wall of said chamber,
- a first container configured to be coupled to the rapid transfer port, said first container housing in its interior a dispensing system which comprises a plurality of dispensing nozzles held in a support,
- a robotic arm configured to remove the support and the plurality of dispensing nozzles from the first container and place them in a liquid dispensing position inside the closed chamber.

Preferably, the robotic arm may also be configured to open the rapid transfer port before removing the plurality of dispensing nozzles from the first container. Thus, human intervention throughout the process is minimised even further.

Advantageously, the robotic arm may also be configured to remove the plurality of dispensing nozzles from the liquid dispensing position and introduce them into the container and close the rapid transfer port, thus achieving the complete elimination of human intervention in the process of preparing the system to carry out the dispensing, carrying out the dispensing and removing the dispensing system when the dispensing is complete and/or when the useful life of said dispensing system has ended.

Advantageously, in the system according to the present invention, the dispensing system may comprise a pipe connected to the plurality of dispensing nozzles and to a second container which contains the liquid to be dispensed, said second container being positioned outside of the first container and of the closed chamber. With this configuration, a large quantity of product can be dispensed, as the dispensing nozzles are supplied from a container that acts as a reservoir and which may have a large capacity as it is not subject to the restrictions imposed by the closed chamber. Alternatively, the dispensing nozzles may be supplied from a container, for example, a bag, present inside of said first container and which contains the product to be dispensed. This configuration is especially advantageous for dispensing small batches. Other configurations for supplying the dispensing nozzles are also possible.

Preferably, said dispensing system is disposable. More specifically, the pipe or pipes supplying the plurality of dispensing nozzles may be disposable, whilst the dispensing nozzles and/or other elements may be reused after being sterilised by means of an autoclave or other suitable sterilisation method. However, it is also possible for all the elements of the dispensing system to be disposable. Alternatively, said dispensing system is reusable.

Preferably, the system according to the present invention may comprise a pump for each dispensing nozzle. In this way, among other advantages, calibration of the dose to be dispensed is made easier, as is monitoring of the operation thereof. Alternatively, the system according to the present invention may comprise a single pump common to each dispensing nozzle or may comprise various pumps, each pump being associated with a portion of the plurality of dispensing nozzles, for example, in an embodiment with two pumps and six dispensing nozzles, each pump supplies three dispensing nozzles. Other alternative options for carrying out the dispensing of the liquid include the use of flow meters or the method generally known as the time/pressure method, in which a supply reservoir is pressurised in a controlled manner and one or more valves open and close one or more outlets for dispensing, the dose dispensed depending on the pressure of the chamber and on the time of the valve(s) are open.

Preferably, the at least one rapid transfer port of the system according to the present invention is a DPTER port (Double Porte pour Transfert Etanche) or SART System® (Sartorius Aseptic Rapid Transfer System). However, the use of other types of rapid transfer ports is possible. In embodiments that comprise more than one rapid transfer port, the ports may all be of the same type or they may be different, for example, a DPTE® port and a SART® port.

Preferably, the DPTER port (Double Porte pour Transfert Etanche) is a rapid transfer port located in a wall of a closed chamber and defining a circular opening, with means for opening and closing the same, for receiving a container or bag with a connection port with a shape matching the one of said circular opening, both ports being configured to produce a leaktight seal between them. Said DPTER port is particularly suitable for the transfer of sterile and/or toxic products, among others, between the inside and the outside, and vice versa, of the closed chamber whose wall comprises the aforementioned rapid transfer port. The port located on the closed chamber, and more specifically, in a wall of the closed chamber, is commonly referred to as an alpha port, while the port of the bag or container for being coupled to said alpha port is commonly referred to as a beta port.

Preferably, the SART® port (Sartorius Aseptic Rapid Transfer System) is a rapid transfer port located in a wall of a closed chamber and which comprises an internal port and an external port with respect to said closed chamber, wherein the external port comprises an orifice defining V-shaped profiles or sections for receiving a connector matching the shape of said orifice. Said port and connector are particularly suitable for transferring liquids between the outside and the inside, and vice versa, of said closed chamber.

Preferably, said closed chamber is isolated. Advantageously, said closed chamber of the system according to the present invention is an isolator. Alternatively, said closed chamber of the system according to the present invention is a cleanroom. Both the cleanroom and the isolator are understood as closed chambers that meet, as a minimum, ISO 14644-1:2015 and ISO 14644-2:2015 or equivalent standards. Both the embodiments in which the closed chamber is a cleanroom and the embodiments in which the closed chamber is an isolator may be configured to dispense blood products and/or haemoderivative products, or to dispense medicines, preferably sterile medicines.

Preferably, each dispensing nozzle comprises a dispensing needle protected by a tubular or similar element which acts as a shield and which is removed before beginning to dispense the liquid. Said shield may be placed back on the dosing needle after completing the dosing of the liquid and before removing the dispensing system from inside the closed chamber. In addition to protecting the dispensing needle from blows, etc. which may damage it, said protector also prevents the needle from perforating the container configured for coupling to the rapid transfer port.

According to another aspect of the present invention, also disclosed is a method of dispensing a liquid in a closed chamber which comprises at least one rapid transfer port in at least one wall of said chamber which comprises the following steps:

coupling to a rapid transfer port a first container which houses in its interior a dispensing system which comprises a plurality of dispensing nozzles held in a support, opening the rapid transfer port so that the interior of the first container is connected with the closed chamber, removing from the first container the support and the plurality of dispensing nozzles and placing them in a liquid dispensing position inside the closed chamber using a robotic arm, dispensing an amount of liquid.

One of the advantages of the method according to the present invention is that it reduces human handling of the product before it is dispensed, as it is possible for a duly qualified operator to carry out one or more of the additional steps that do not involve direct interaction with the product, such as, for example, opening the rapid transfer port.

Preferably, the method according to the present invention may also comprise the following steps:

removing the support and the plurality of dispensing nozzles from the dispensing position and re-introducing them into the first container, closing the rapid transfer port, uncoupling the first container from the rapid transfer port.

Advantageously, in the method according to the present invention the opening of the rapid transfer port is carried out by a robotic arm.

Preferably, in the method according to the present invention the closing of the rapid transfer port is carried out by a robotic arm.

Advantageously, in the method according to the present invention the removal of the dispensing nozzles and the re-introduction into the first container is carried out by a robotic arm.

Because of the above, human intervention in the dispensing process and in the processes ancillary thereto can be eliminated as all the steps from coupling the first container to the rapid transfer port to uncoupling said first container after the dispensing of the product is completed, are carried out by a robotic arm. Preferably, a single robotic arm is responsible for handling the rapid transfer port and the dispensing system, although, alternatively, having one robotic arm for handling the rapid transfer port and another for handling the dispensing system is also possible.

Preferably, in the method according to the present invention before carrying out the dispensing of the liquid, a pipe connected to the plurality of dispensing nozzles is connected to a second container which contains the liquid to be dispensed, said second container being positioned outside of the first container and of the closed chamber. It is thus possible to dispense a large quantity of liquid whilst ensuring the sterility thereof and of the closed chamber (cleanroom, isolator, etc.) as the plurality of dispensing nozzles is supplied directly from a second container which acts as a reservoir for the liquid to be dispensed. Alternatively, in the method according to the present invention, the second container connected to the plurality of dispensing nozzles and responsible for the supply thereof, may be situated inside the first container. This option has the drawback that the size of the second container must be smaller, as it must be contained within the first container, and therefore it is only recommended for dispensing small quantities of liquid.

Although the system and method according to the present invention have been described above with a plurality of dispensing nozzles, said method and said system may also be carried out with a single dispensing nozzle. The use of a single dispensing nozzle instead of a plurality thereof may be advantageous if, among other circumstances, working with very small batches of product.

Advantageously, in the method object of the present invention the liquid to be dispensed is a blood product and/or a haemoderivative product. Alternatively, in the method object of the present invention the liquid to be dispensed is a medicine.

In this document, the grades of cleanliness of a cleanroom and/or an isolator are understood as defined by ISO 14644-1:2015 or equivalent standards. In this document, the terms 'cleanroom' and 'white room' are used in an equivalent and interchangeable manner. Although in this document the terms 'dispense' and 'dispensing' are used, said terms may be replaced by the terms 'dosing' and 'dosage' respectively. The terms 'method' and 'process' are considered equivalent and interchangeable in the present document.

For a better understanding, the accompanying drawings showing at least one embodiment of the system and of the method for dispensing a liquid in a closed chamber according to the present invention are given as an explanatory but non-limiting example.

Figure 1:
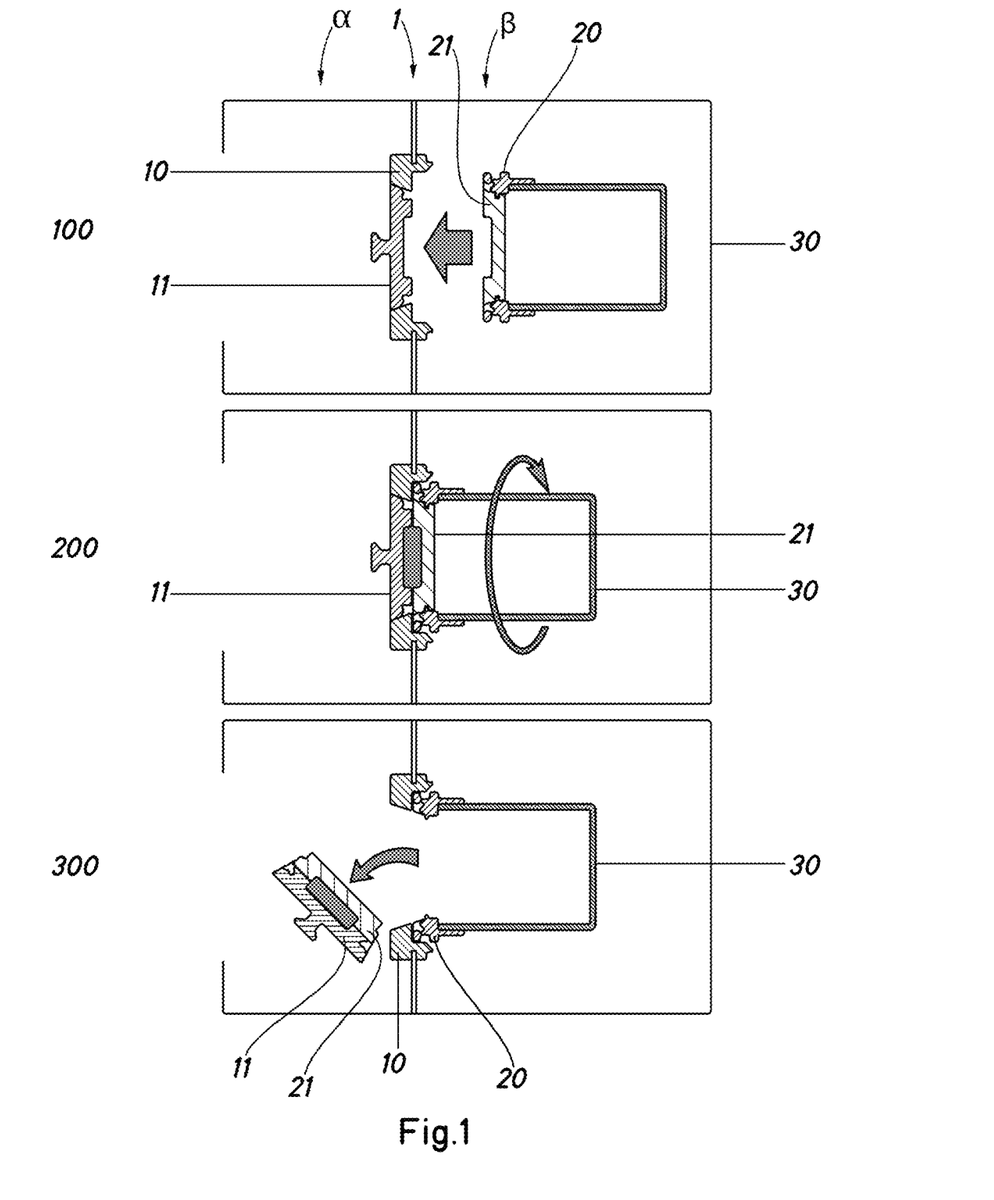
FIG. 1 is a diagram of a rapid transfer port.

FIG. 1 is a diagrammatic view of a rapid transfer port.

Figure 2:
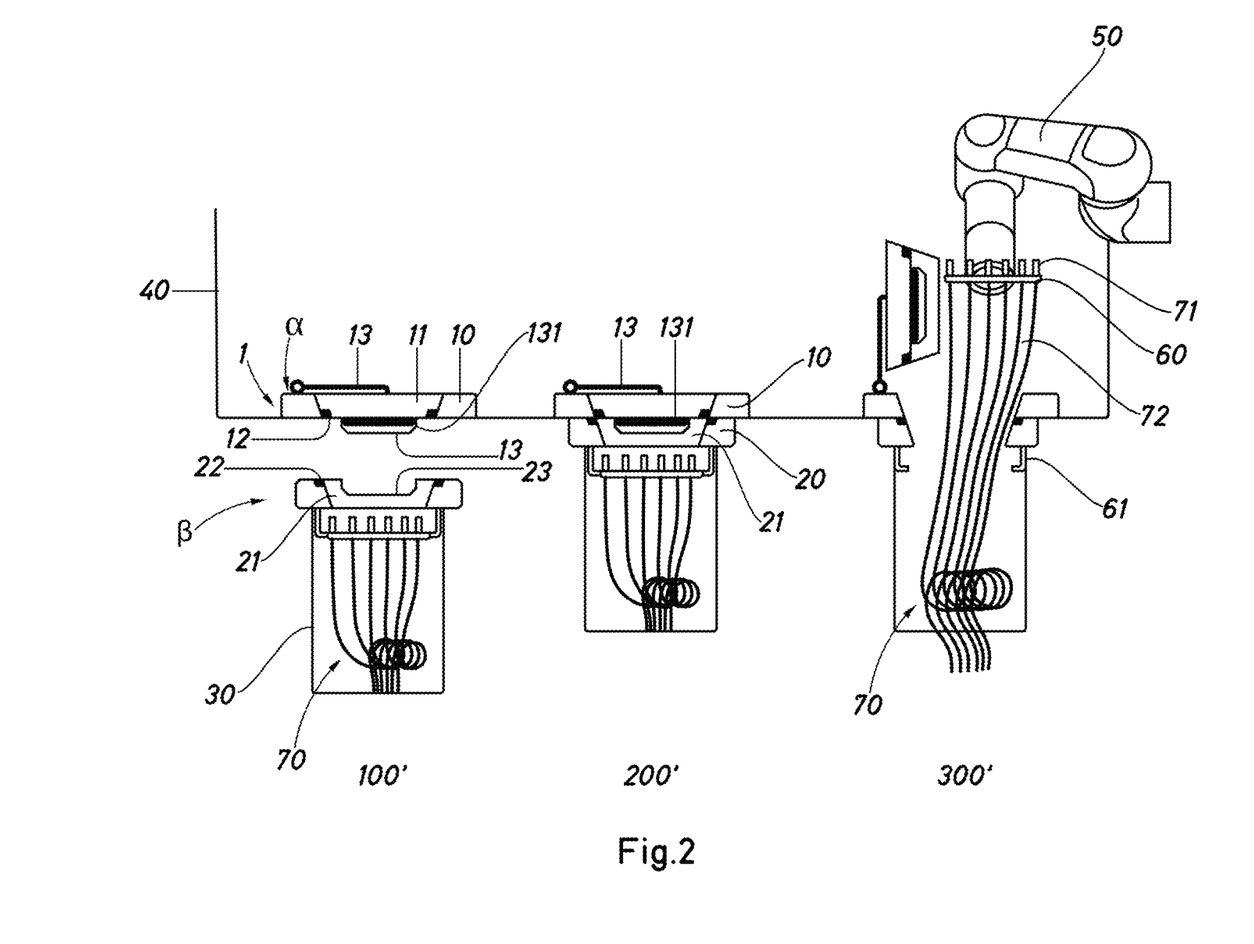
FIG. 2 is a diagram of an embodiment of a system according to the present invention.

FIG. 2 is a diagrammatic view of an embodiment of a system according to the present invention.

Figure 3:
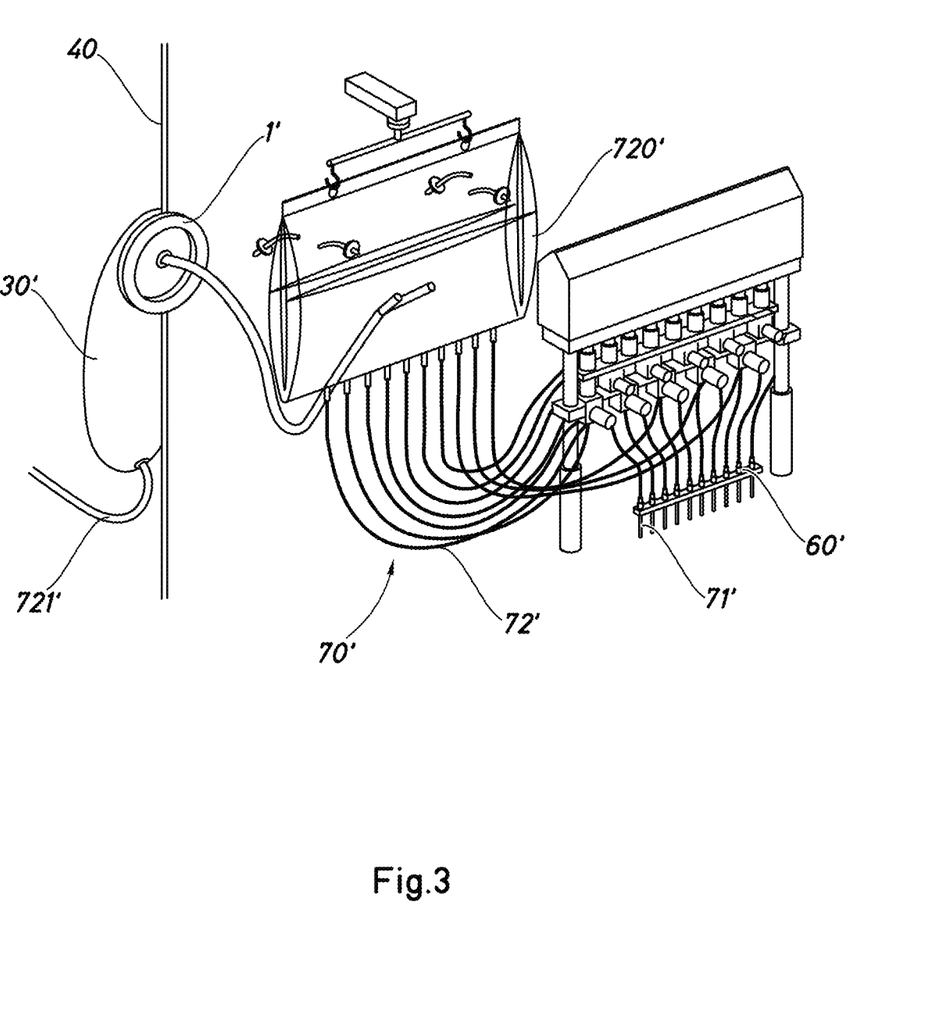
FIG. 3 is a perspective view of a dispensing system that can be used with the system according to the present invention.

FIG. 3 is a perspective view of a dispensing system that can be used with the system according to the present invention.

Figure 4:
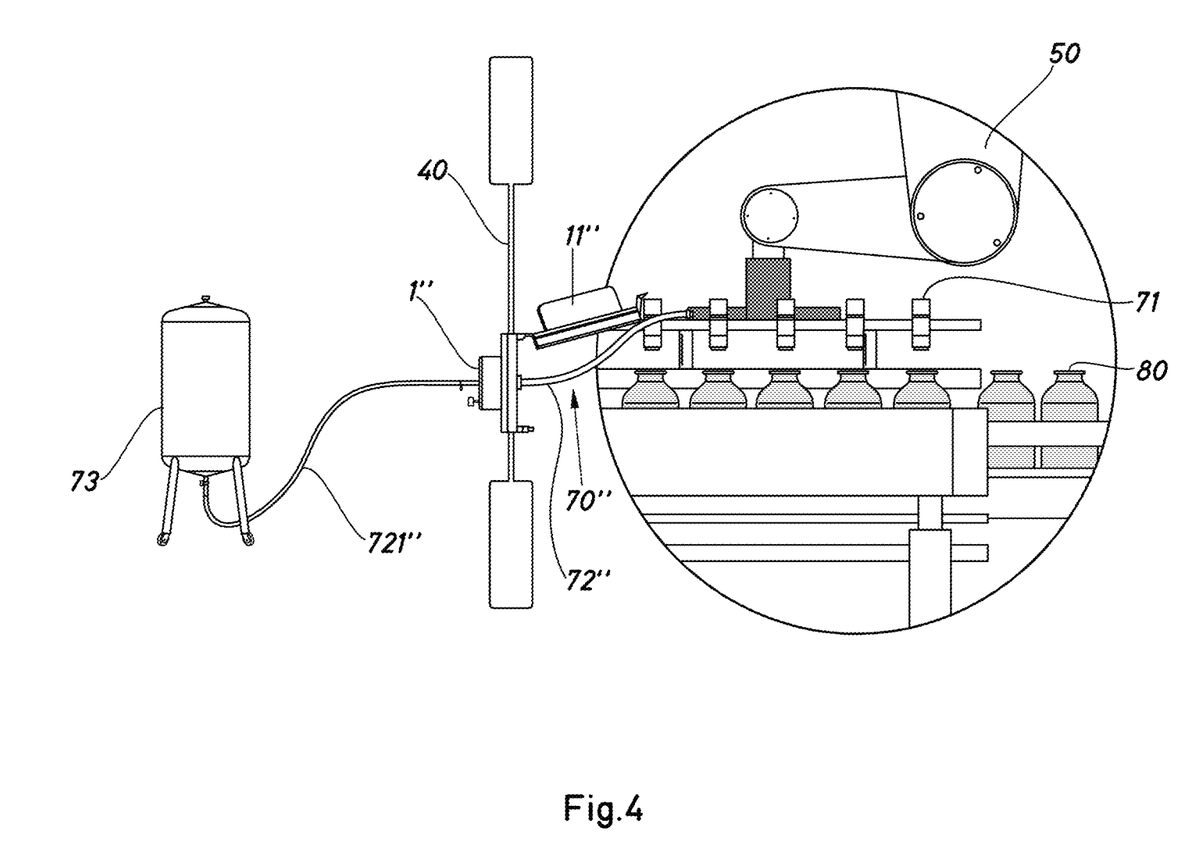
FIG. 4 is a diagram in elevation of an embodiment of a system according to the present invention.

FIG. 4 is a diagrammatic view in elevation of an embodiment of a system according to the present invention.

Figure 5:
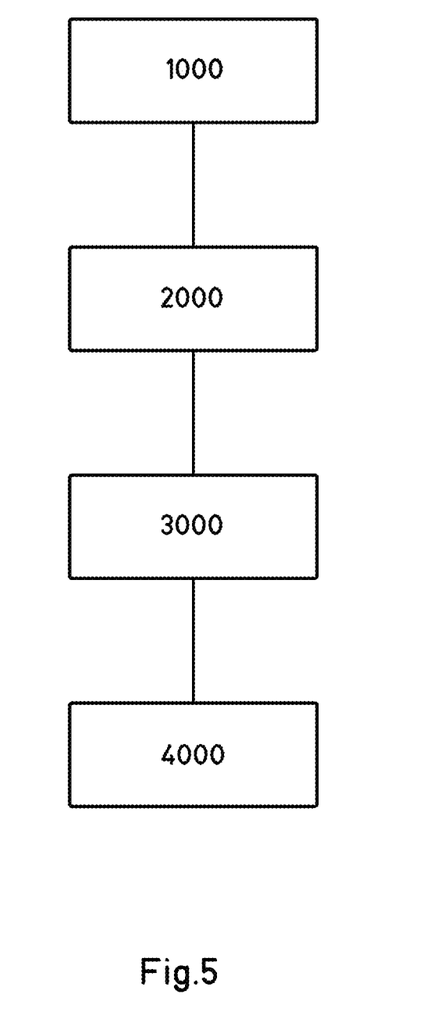
FIG. 5 is a flow diagram of a first embodiment of a method according to the present invention.

FIG. 5 is a flow diagram of a first embodiment of a method according to the present invention.

Figure 6:
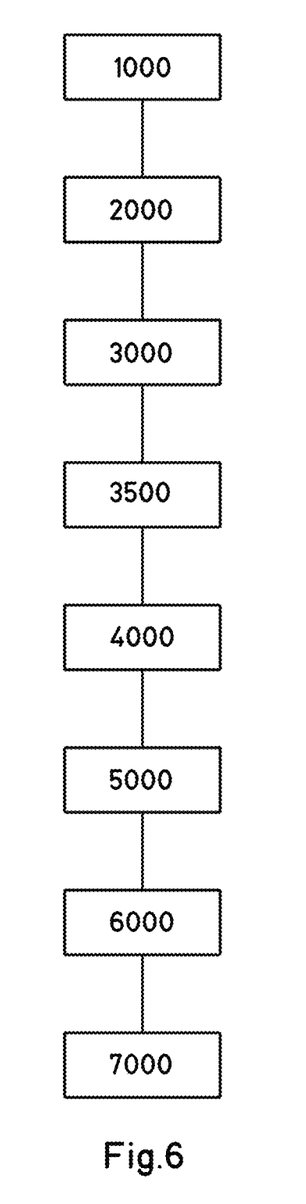
FIG. 6 is a flow diagram of a second embodiment of a method according to the present invention.

FIG. 6 is a flow diagram of a second embodiment of a method according to the present invention.

In the figures, elements that are the same or equivalent have been identified with identical reference numerals.

FIG. 1 shows diagrammatically a rapid transfer port and, more specifically, shows diagrammatically the operation thereof. The rapid transfer port shown in this figure is of the DPTER (Double Porte pour Transfert Etanche) type. However, the principle of the operation of a DPTE® port is applicable to other rapid transfer ports.

A DPTE® port basically comprises two portions, an alpha α port and a beta β port. The alpha α port is usually installed in a surface such as, for example, the wall of an isolator. The alpha α port usually comprises a flange 10, a seal and a gate 11. Usually, the beta β port also comprises a flange 20, a seal and a gate 21 and is connected to a container 30, another isolator or another device suitable for transfers, such as, for example, a bag. After connecting the alpha α and beta β ports, by rotating the beta β portion through about 60 degrees, the gates 11, 21 are connected and act as a single part, at which moment the alpha α side of the unit can be opened, giving access to the isolator or cleanroom. The outer surfaces of the gates 11, 21 of the alpha α and beta β portions remain firmly connected until the alpha α gate 11 is closed and an opposite rotation of the beta β unit takes place, separating the two gates 11, 21. For a correct operation of the system, the beta β container 30 or the attached device must be internally sterile, like the isolator.

FIG. 1 shows in a simplified manner the process of coupling a container 30 provided with a beta β port to an alpha α port installed in the wall of an isolator. The first step 100 consists in coupling the beta β port of the container 30 to the alpha α port of the isolator, at which moment the gates 11, 21 of the respective ports α, β close the aperture defined by the respective flanges 10, 20.

After coupling the beta α to the alpha α port, the second step 200 consists in rotating the beta port β, which is usually rigidly connected to the container 30, until the gates 11, 21 are connected to one another, so that the dirty faces of both are in contact and isolated with respect to the interior of the isolator or cleanroom and the interior of the container 30. Said rotation of the beta port β is usually about 60 degrees.

Once both gates 11, 21 are connected to one another, the third step 300 consists in opening the gates 11, 21 so that the interior of the container 30 is in communication with the interior of the isolator.

It is important to mention that before initiating the process described here, the interior of the container 30 has been sterilised using an autoclave, radiation or any other applicable technique. Although it cannot be seen in FIG. 1, the alpha α and beta β ports comprise respective seals to provide a sealed closure between both ports.

FIG. 2 shows diagrammatically an embodiment of a system according to the present invention. In the system of the embodiment shown, the rapid transfer port 1 is of the DPTER type, i.e., similar to that in FIG. 1. Consequently, said rapid transfer port 1 also comprises and alpha α portion and a beta β portion. The beta β portion is part of a container 30 which contains in its interior a dispensing system 70. Said rapid transfer port is mounted in an isolator 40, although in other embodiments it may be mounted in a cleanroom. The presence of more than one rapid transfer port 1 is also possible, and all said ports may be of the same type or of a different type (DPTE®, SART®, etc.).

In the embodiment shown, the alpha α portion comprises a flange 10, a seal 12 and a gate 11 connected to the flange 10 by a hinge 13. However, in other embodiments the gate 10 may not be hinged or the hinge 13 may have a different arrangement from that shown here. Similarly, the beta β portion also comprises a flange 20, a gate 21 and a seal 22. In addition, to facilitate the coupling between the alpha α portion and the beta β portion, the gate 11 comprises a projection 13 configured to accommodate a recess 23 of a matching shape present in the gate 21. In addition, the projection 13 in the embodiment shown comprises a seal 131 to guarantee that the connection of the gates 11, 21 is sealed.

In the embodiment shown, the dispensing system 70 comprises a plurality of dispensing nozzles 71 associated with respective supply pipes 72. Said plurality of dispensing nozzles 71 may be held in a support 60. Said support 60 facilitates the combined handling of the plurality of dispensing nozzles 71 by a robotic arm 50. Said support 60 for the dispensing nozzles is in turn attached to the container 30 or to the flange 20 by a support 61 which, as well as holding the support 60, may act to protect said support and the dispensing nozzles 71 against blows, etc. Said protection is particularly important in embodiments in which the container 30 is not rigid or is semi-rigid, such as, for example, if it is a bag.

The robotic arm 50 allows human intervention in the dispensing process to be eliminated, or significantly reduced, thus reducing the risk of accident or contamination due to human error and increasing security at work for employees, particularly given that the liquid to be dispensed may on occasion be toxic, irritant, etc., in other words, harmful to health.

The fluid dispensing system 70 may be disposable, i.e. may be destroyed or discarded after the fluid dispensing is complete or alternatively reusable. If it is reusable, after the dispensing process has ended it must be properly sterilised using any suitable sterilisation method. It is also possible for the dispensing system 70 to be partly reusable and partly disposable, i.e., for example, the dispensing nozzles 71 are reusable, whereas the respective supply pipes 72 and/or other elements are disposable. If any element of the dispensing system 70 is reusable, said element must be properly sterilised by any suitable sterilisation system (heat, steam, radiation, chemical agents, etc.) before being used again.

FIG. 2 shows three distinct phases of the process of dispensing a liquid by means of an embodiment of a system according to the present invention. In the first phase 100' the alpha α port of the isolator 40 and the beta α port of the container 30 are closed and said container 30 houses in its interior a fluid dispensing system 70.

The second phase 200' consists in connecting the alpha α port to the beta β port in order subsequently to lock together the gates 11, 21 of the alpha α and beta β portions using, in this embodiment, a rotation of the beta β port and of the container 30 rigidly connected thereto. However, in other embodiments in which the rapid transfer port is of a different typology, the connection and locking process may differ from that described above.

In the third phase 300' shown in FIG. 2 the gates 11, 21 have already been opened so that the interior of the isolator 40 and of the container 30 are in communication. At the moment illustrated, the robotic arm 50 is in the process of placing the plurality of dispensing nozzles 71 in a dispensing position after grasping the support 60 and then removing it, together with the plurality of dispensing nozzles 71, from the respective support 61 in the container. In the third phase 300' illustrated, before removing the support 60 with the corresponding dispensing nozzles 71 from the container 30, the ends of the supply pipes 72 have been removed from the container 30. Accordingly, the container 30 comprises means for removing said supply pipes whilst maintaining their sterility and without breaking the isolation of the interior of the container 30 from the exterior. Although in FIG. 2 a plurality of supply pipes 72 has been shown passing through the container 30, usually a single connection with the exterior is made after joining the plurality of supply pipes 72 into a single pipe (see FIG. 3).

In the embodiment shown, the interior of the isolator 40 may be grade A according to ISO 14644-1:2015, whilst the exterior thereof may be grade B, C or D, as circumstances require, thus reducing the technical complexity and the associated economic cost involved in maintaining a grade A closed chamber, such as, for example, a white room. This is because when using the system shown in FIG. 2 only the interior of the isolator, where the most critical processes are carried out, need be maintained at grade A and this is usually of a relatively small size compared with the rooms housing them, that may have a lower grade of cleanliness.

FIG. 3 is a perspective view of a dispensing system 72' which may be used in a system according to the present invention. In the embodiment shown in FIG. 3, the rapid transfer port 1' is of the SART® type and the container 30' associated therewith is a flexible bag configured to maintain hermetic conditions even though the pipe 721' passes into and through said bag. In a way similar to that shown diagrammatically in FIG. 2, the dispensing system 72' shown in this figure comprises a plurality of dispensing nozzles 71' held in the same support 60' configured to be handled by a robotic arm. However, unlike the dispensing system 72 of FIG. 2, that shown in FIG. 3 comprises a bag 720' which acts as a buffer reservoir responsible for supplying the various pipes 72' which supply each dispensing nozzle 71' directly and individually. Said pipe 721' is responsible for supplying the bag 720', which in turn supplies the various pipes 72'. Said pipe 721' may be connected to an external reservoir for supplying the product to be dispensed continuously (see FIG. 4).

FIG. 4 shows diagrammatically an embodiment of a system according to the present invention. In this figure, the dispensing system 70", as well as other elements, has been shown in a simplified manner. This figure shows how the reservoir 73 supplies the plurality of dispensing nozzles 71 through the pipes 721", 72", which are inserted into the isolator 40 through the rapid transfer port 1". This arrangement is particularly advantageous for dispensing large batches of product, as the reservoir 73 may be of a large size since said reservoir is not subject to the space restrictions imposed by the size of the isolator 40. In the embodiment shown in this figure, the dispensing system according to the present invention dispenses a fixed amount of liquid into vials 80. Said liquid is preferably a haemoderivative product or a drug, although it may be any type of liquid (a food product, a chemical product, etc.).

Although in FIGS. 2 to 4 the system according to the present invention is configured to dispense relatively large amounts of fluid, in other embodiments said system may be configured to dispense smaller amounts of product. Accordingly, the system according to the present invention may have, for example, a small container which acts as a reservoir inside the container 30, 30' and is connected to the dispensing system 70, 70' in such a way that said small internal reservoir may supply the plurality of dispensing nozzles 71, 71'. Although this configuration may have lower productivity than that shown in FIGS. 2 to 4, it has the advantage of eliminating the need to have a connection with the exterior of the sterile closed chamber, whether this is an isolator 40 or a cleanroom, thus significantly reducing the risk of contamination of the sterile area due to error or accident.

FIG. 5 is a flow diagram of a first embodiment of a method of dispensing a liquid according to the present invention. The first step 1000 consists in coupling to a rapid transfer port 1, 1', 1" a container 30, 30' which houses in its interior a dispensing system 70, 70', 70" which comprises a plurality of dispensing nozzles 71 held in a support 60. The second step 2000 consists in opening the rapid transfer port 1 so that the interior of the first container 30, 30' is in connection with the closed chamber 40. The third step 3000 consists in removing from the container 30, 30' the support 60 and the plurality of dispensing nozzles 71 held therein and placing them in a liquid dispensing position inside the closed chamber 40 using a robotic arm 50. The fourth step 4000 consists in dispensing a fixed amount of liquid into a destination container, for example, a vial. Although, preferably, in the present invention each dispensing nozzle 71 dispenses fluid into a different container, it is also possible that more than one nozzle 71 dispenses into a common container.

FIG. 6 is a flow diagram of a second embodiment of a method of dispensing a liquid according to the present invention. In this second embodiment, the steps 1000, 2000, 3000 and 4000 are similar to those described in FIG. 5, and therefore will not be described again. In the second embodiment, the dispensing method comprises an additional step 3500 between the third 3000 and the fourth 4000 step, which consists in connecting a pipe 721, 721' which supplies the plurality of dispensing nozzles 71 to a container 73 positioned outside of the container 30, 30' and of the closed chamber 40 and which contains the liquid to be dispensed.

The second embodiment in FIG. 6 after step 4000 which consists of dosing the liquid comprises the fifth step 5000 which consists of removing the support 60 and the plurality of dispensing nozzles 71 from the dispensing position and re-inserting them into the container 30, 30'. After completing the fifth step 5000, the sixth step 6000 consists in closing the rapid transfer port 1, 1', 1" so that the respective gates 11, 21 of the alpha α portion and beta (portion close the isolator 40 and the container 30, 30', respectively. The seventh step 7000 consists in uncoupling the container 30, 30' from the rapid transfer port 1, 1', 1" and then discarding or recycling the container 30, 30' and/or the used dispensing system 70, 70', 70" contained therein.

Preferably, steps 2000, 3000, 4000, 5000 and 6000 are carried out by a robotic arm 50, in other words, with no human interaction with the fluid to be dispensed or with the dispensing system 70, 70', thus reducing the risk of accidents and/or contamination due to human error. The part of step 3500 that takes place inside the closed chamber is also preferably carried out by a robotic arm 50. The closed chamber may comprise a robotic arm 50 capable of carrying out the steps described above or may comprise more than one robotic arm, each of said robotic arms specialising in carrying out specific steps from among those described above.

Although, preferably, a robotic arm is used in the present invention to carry out the steps performed inside the closed chamber 40 and the container 30, 30', embodiments are also possible in which the robotic arm only carries out the steps 3000 and 4000 described above, the rest of the steps being carried out in a conventional way by an operator handling the components inside the closed chamber 40 through specially designed gloves. Embodiments in which the process is carried out completely automatically by the use of one or more robotic arms may also have handling gloves as a safeguard in case a problem occurs inside the closed chamber 40.

For the description of FIGS. 5 and 6, and those shown in the figures, the reference numerals shown in FIGS. 1 to 4 have been used, to make said figures easier to understand.

Although the invention has been presented and described with reference to embodiments thereof, it should be understood that said embodiments do not limit the invention, and therefore many structural or other details which may be obvious to persons skilled in the art after interpreting the subject matter disclosed in the present description, claims and drawings, may vary. In particular, in principle and unless explicitly stated otherwise, all the characteristics of each of the different embodiments and alternatives shown and/or suggested may be combined with one another. Thus, all variants and equivalents are included within the scope of the present invention if they can be considered to fall within the widest scope of the following claims.

What is claimed is:

1. A system for dispensing a liquid in a closed chamber which comprises:
    a rapid transfer port in at least one wall of the closed chamber;
    a first container configured to be coupled to the rapid transfer port,
    wherein, the first container housing in its interior a dispensing system which comprises a plurality of dispensing nozzles held in a support;
    a robotic arm configured to remove the support and the plurality of dispensing nozzles from the first container and place them in a liquid dispensing position inside the closed chamber; and
    a plurality of pumps configured to dispense the liquid, wherein each pump is connected to a separate one of the plurality of dispensing nozzles via a separate one of a plurality of supply pipes wherein, there is a one to one to one correspondence between the pumps, nozzles and supply pipes.

2. The system of claim 1, wherein the robotic arm is further configured to open the rapid transfer port before removing the plurality of dispensing nozzles from the first container.

3. The system of claim 1, wherein the robotic arm is further configured to remove the plurality of dispensing nozzles from the liquid dispensing position and introduce them into the container and close the rapid transfer port.

4. The system of claim 1, wherein the dispensing system comprises a pipe connected to the plurality of dispensing nozzles and to a second container which contains the liquid to be dispensed, wherein the second container is positioned outside of the first container and of the closed chamber.

5. The system of claim 1, wherein the rapid transfer port is a double door transfer port or an aseptic rapid transfer system.

6. The system of claim 1, wherein the closed chamber is an isolator.

7. The system of claim 1, wherein the closed chamber is a cleanroom.

8. The system of claim 7, wherein the closed chamber is configured to dispense blood products and/or haemoderivative products.

9. The system of claim 7, wherein the closed chamber is configured to dispense medicines.

10. A method of dispensing a liquid in a closed chamber that comprises one rapid transfer port in one wall of the closed chamber, the method comprising:
    coupling the rapid transfer port to a first container, wherein the first container comprises a dispensing system and a plurality of dispensing nozzles held in a support, wherein each of the plurality of dispensing nozzles is connected with one of a plurality of pumps using one of a plurality of supply pipes wherein, there is a one to one to one correspondence between the pumps, nozzles and supply pipes;
    opening the rapid transfer port so that the interior of the first container is connected with the closed chamber;
    removing the support and the plurality of dispensing nozzles from the first container and placing them in a liquid dispensing position inside the closed chamber using a robotic arm; and
    dispensing an amount of liquid through at least one of the plurality of dispensing nozzles by action of the pump connected with one of the plurality of dispensing nozzles using one of the plurality of supply pipes.

11. The method of claim 10, further comprising:
    removing the support and the plurality of dispensing nozzles from the dispensing position and re-introducing them into the first container;
    closing the rapid transfer port; and
    uncoupling the first container from the rapid transfer port.

12. The method of claim 10, wherein the opening of the rapid transfer port is carried out by a robotic arm.

13. The method of claim 11, wherein the closing of the rapid transfer port is carried out by a robotic arm.

14. The method of claim 13, wherein the removal of the dispensing nozzles and the re-introduction into the first container is carried out by a robotic arm.

15. The method of claim 14, wherein before carrying out the dispensing of the liquid, a pipe connected to the plurality of dispensing nozzles is connected to a second container containing the liquid to be dispensed, wherein the second container being is outside of the first container and of the closed chamber.

* * * * *